Figure 1:
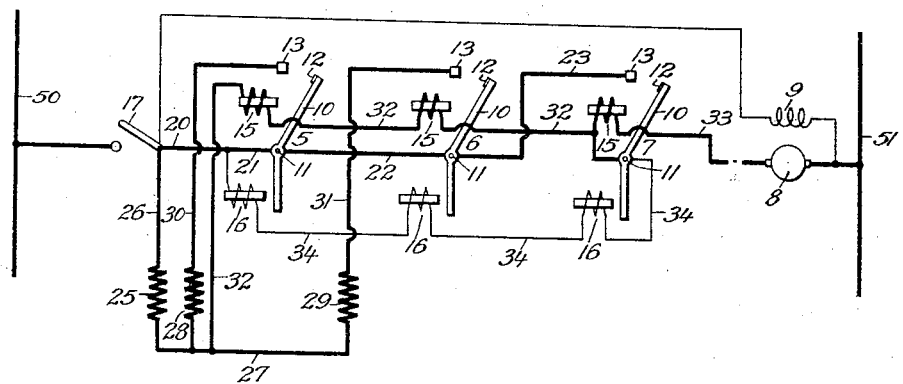

June 10, 1924.

C. T. EVANS.

CURRENT CONTROL SYSTEM

Filed Nov. 15, 1917

1,496,775

Inventor
Clarence T. Evans

By: Edwin B. H. Tower Jr. Atty.

Patented June 10, 1924.

1,496,775

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

CURRENT-CONTROL SYSTEM.

Application filed November 15, 1917. Serial No. 202,213.

*To all whom it may concern:*

Be it known that I, CLARENCE T. EVANS, a citizen of the United States, residing at Milwaukee, in the county of Milwaukee and State of Wisconsin, have invented new and useful Improvements in Current - Control Systems, of which the following is a specification.

This invention relates to current control systems, and particularly to that type of systems known as lockout switch systems.

Lockout switches are adapted to remain open when the current in the circuits they control is above a predetermined value and to close when the current is below a predetermined value. Switches of this type are useful in connection with systems wherein the current in the main or work circuit is high at starting and decreases as an element of the time of application. A particularly useful field is in starting systems for electric motors where they may be employed to automatically reduce the resistance in the motor circuit as the starting current successively decreases to predetermined values. The switches may however be employed in other connections, as for example, electric arc welding and mercury vapor lamp systems.

A common form of such a switch has a switch arm acted upon by two electromagnets, one tending to hold the switch open and the other tending to close the switch. For current below a predetermined value the closing electromagnet predominates, and for current above a predetermined value the hold out electromagnet predominates. Both electromagnets, receiving energizing current at the same time, tend to function simultaneously. During the building up of the effect of even ultimately excessive currents such a switch therefore tends to pass through a condition wherein the closing electromagnet is in the ascendency and the switch would be prematurely closed. Such a condition is obviated by producing a lag in the building up of the field of force in the closing electromagnet so that the hold out electromagnet cannot be overpowered during the brief period when the energizing current is rising. Also with the switches heretofore used the sections of starting resistance, or other current limiting means, have been connected in series so that it was necessary that each section and each switch be designed to carry the entire load current.

The lockout switch employed herein may be of the type disclosed in the Barnum et al., British Patent 22,435 of 1914.

One of the objects of this invention is to provide a lockout switch system wherein it is unnecessary to cause a lag in the building up of the field of force of the closing electromagnet.

Another object is to provide a system with a wide range of adjustment.

Another object is to provide a system whereby the current carrying capacity of the current limiting means may be reduced.

Another object is to provide a system whereby the current limiting resistances may be connected in parallel.

Another object is to provide a system wherein the current carrying capacity of the switch may be reduced.

Another object is to provide a system in which the switches may be of light construction.

Another object is to provide a system which is inexpensive, simple, reliable and efficient.

Other objects will appear from the following description and claims:

In the accompanying drawing the invention is diagrammatically illustrated in connection with a motor starting system since from this its use in other connections will be readily understood.

Figure 2:
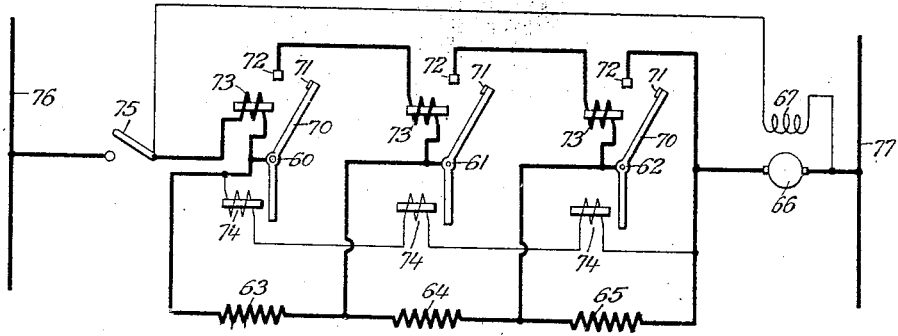

In the drawing:

Figure 1 shows the switch used in a motor starting system wherein a parallel arrangement of resistances is utilized to control the starting current, and Fig. 2 shows the switch used in a motor starting system with a series arrangement of current control resistances.

The switch comprises a pair of electromagnets, one acting to close the switch and the other acting to hold the switch open. The coil of the closing electromagnet is adapted to be controlled by the work or motor armature current, while the coil of the hold out electromagnet is adapted to be controlled by the potential across the current limiting resistance, or other current control means. The current limiting resistances, or resistance sections, may be arranged in the usual series arrangement, reduction being effected by successively excluding resistance sections from circuit. With this switch, however, the current limiting resistance may be arranged to be successively connected in parallel to effect reductions in resistance. This makes it possible to use smaller resistors and switches since each is not compelled to carry the full load current.

In Figure 1 three lockout switches 5, 6 and 7 are shown to control the current flowing through a motor armature 8. The motor field 9 is connected in the usual manner.

Each switch comprises a switch arm 10 pivoted at 11 and having a movable contact 12 and a fixed contact 13. The arm 10 is normally biased to open position and is acted upon by a closing electromagnet 15 which tends to rotate the arm to close contacts 12—13. Arm 10 is also acted upon by hold out electromagnet 16 which when energized tends to keep contacts 12—13 from closing. The operation of the system is controlled by a switch 17.

Switch 17 is joined to the arm 10 of switch 5 by a conductor 20 and this arm is also connected to one terminal of the hold out coil 16 of switch 5 by a conductor 21. The switch arms of switches 5 and 6 are joined by a conductor 22, and arm 10 of switch 6 is connected by a lead 23 to fixed contact 13 of switch 7. A current limiting resistance 25 is connected to switch 17 by a conductor 26 and to a conductor 27. Two other current limiting resistances 28 and 29 are connected to fixed contacts 13 of switches 5 and 6 respectively by leads 30 and 31, and to conductor 27. Closing coils 15 are connected in series between conductor 27 and armature 8 by leads 32 and 33 while the hold out windings 16 are connected in series to the arms 10 of switches 5 and 7 by conductors 21 and 34. The energization of the closing electromagnets for the switches is thus dependent upon the armature current, while the energization of the hold out electromagnets is dependent upon the drop of potential across the armature limiting resistance. The hold out electromagnets are so proportioned that each permits the corresponding closing electromagnet to effect the closing of its respective switch when the current through the active starting resistance, or, in other words, the drop in potential across the starting resistance then in circuit reaches a predetermined value. For example, switch 5 will close when the voltage across the hold out coils 16 corresponds to the drop in potential over resistance 25 at the predetermined closing current, while switch 6 will close when the voltage across the hold out coils corresponds to the drop over resistances 25 and 28 in parallel. Likewise the closing of switch 7 is determined by the drop across resistances 25, 28 and 29 in parallel. Thus the closing of each switch is dependent not only upon the value of the current in the armature circuit, but upon the amount of resistance in that circuit.

The operation is as follows: The closing of switch 17 completes a circuit from line 50 through conductor 26, resistance 25, conductors 27 and 32, in series through the closing coils 15 by conductor 32, conductor 33 and armature 8 to line 51. The current to the motor armature is therefore limited by resistance 25. The flow of current in the main circuit just traced also causes a flow of current through the hold out coil 16 in an amount dependent upon the voltage drop across the resistance 25, which, of course, is dependent upon the amount of the resistance and the current flowing therethrough. Both coils 15 and 16 of each switch exert an attractive force upon the arm of their corresponding switches. Until the main current, and consequently the drop across the limiting resistance, falls to the predetermined figure the force exerted by the holding coils predominates and the switches remain open. When, because of the building up of the counter electromotive force of the motor, the current falls to a predetermined value the closing coil of switch 5 overcomes the force exerted by the hold out coil and switch 5 closes. Switches 6 and 7, however, do not close since, as previously pointed out, the force exerted by their closing coils will not overcome the force exerted by their hold out coils when the latter are influenced by the drop in potential across resistance 25 produced by a flow of current in excess of an amount below the critical closing value of switch 5.

The closure of switch 5 connects resistance 28 in parallel with resistance 25 through conductor 20, arm 10, contacts 12 and 13, conductor 30 and resistance 28 to conductor 27. From thence the circuit is the same as that previously traced. Resistances 25 and 28 being connected in parallel reduce the resistance in the motor armature circuit and the current flowing therethrough increases. The hold out windings 16 are now connected across a resistance represented by resistances 25 and 28 in parallel and are therefore traversed by a current depending upon the drop over their paralleled value. This drop, at current values above a predetermined amount, is sufficient to cause a flow of current through coil 16 preventing closing coil 15 of switch 6 from overpowering its corresponding hold out coil 16 and closing switch 6. When the main current falls to a predetermined value, however, coil 15 overpowers the coil 16 and switch 6 closes. Switch 7, however, remains open since the drop across resistances 25 and 28 in parallel at the critical value of the closing current for switch 6 causes a sufficient amount of current to flow through the hold out coil 16 to prevent its being overpowered by the closing coil 15. Now resistances 25, 28 and 29 are all connected in parallel in the motor circuit, the resistance of that circuit is correspondingly reduced and the main current increases. The hold out coils 16 of the switches are now connected across this paralleled resistance. When, because of the building up of the motor counter electromotive force, the main current falls to a predetermined value, the closing coil 15 of switch 7 overpowers its hold out coil 16 and switch 7 closes. The closing of switch 7 completes a main circuit from line 50 directly through conductors 20, 22 and 23, contacts 13 and 12 and closing coil 15 of switch 7, conductor 33 and motor armature 8 to line 51. The closing coils of all the switches preceding the last are therefore short circuited and the switches may open without effect. The current limiting resistances are also short circuited so that no current flows through any of the switch hold out coils.

The control of the starting current by the paralleling of the current limiting resistances allows of the use of resistance units having smaller current carrying capacity, since, except for the first resistance for a very short time, none of them have to carry the entire load current. The current each carries is inversely proportional to the amount of its resistance and decreases as the operation progresses. The switch arms 10, except for the last switch of the series, may be made lighter because each carries only a portion of the load current. They therefore require less force to operate and the coils may be made smaller. A saving may thus be effected in the switch structure.

Figure 2 shows three lockout switches 60, 61 and 62 arranged to control the inclusion of three current limiting resistances 63, 64 and 65 arranged for series connection in the circuit of a motor armature 66. The motor field 67 is connected in the usual manner. Each switch as before comprises an arm 70 carrying a contact 71 adapted to make and break engagement with fixed contact 72. Each arm 70 is acted upon by a closing winding 73 and a hold out winding 74. The hold out windings 74 of all of the switches are connected in series across the current limiting resistances so as to be affected by the drop in potential across the resistance in the motor armature circuit. The closing windings 73, however, are adapted to be successively brought into the motor armature circuit as the closing of the switches progresses.

The operation is as follows: Upon the closure of the master switch 75 a circuit is completed from line 76 through closing winding 73 of switch 70, resistances 63, 64 and 65 and motor armature 66 to line 77. Current, determined by the fall of potential over resistances 63, 64 and 65 in series, also flows through the hold out coils 74 of all of the switches. The coils of switch 70 are so proportioned that until the current falls to a predetermined value the pull exerted by its hold out winding 74 overpowers the force exerted by its closing winding 73 and the switch remains open. When, however, the current falls to a predetermined value the coil 73 predominates and switch 70 closes. The closure of switch 70 short circuits resistance 63 thus reducing the amount of resistance in the motor armature circuit and the main current increases. However, the increase in the main current causes a less amount of current to flow through the hold out windings 74 than before because for the same current values the drop in potential across the circuit of the hold out windings 74 has been decreased by the exclusion of resistance 63. When the current falls to a predetermined value the coil 73 overpowers coil 74 of switch 61 and this switch closes. The closure of switch 61 excludes resistance 64 from the motor armature circuit and the current again increases. The closure of this switch also includes the closing coil 73 of switch 62 in the main circuit. The short circuit of resistance 64 has the effect of placing the hold out windings 74 of all the switches across only resistance 65. When the current again falls to a predetermined value switch 62 closes and the last step of resistance 65 is removed from the armature circuit and a direct circuit for the motor armature is completed in series through all of the closing windings 73 and the contacts 72 and 71 of the switches. Since all of the resistances are short circuited the hold out windings 74 receive no current and exert no influence upon the arms tending to open the switches. Being relieved of current during the normal operation of the motor they may be made of less current carrying capacity.

In both systems it will be noted that the closure of the master switch causes the energization of all of the hold out coils. It is, therefore, unnecessary, except in the case of the first switch of the series, to produce a lag in the building up of the field of force for the closing electromagnets in order to prevent the switch from prematurely closing as the current rises to and above the proper closing value upon the operation of the preceding switch.

It will also be noted that, the closing of each switch being dependent upon the drop in potential over a section of resistance in the main or work circuit, the switches may be independently set to close at successively higher, the same or lower values for the line current even though the coils are permanently connected in series. A wide range of adjustment is therefore permissible.

What I claim is:

1. The combination of a work circuit, current limiting means therefor, and a switch for controlling the relation between said work circuit and said means, said switch having one electromagnet connected in series with the work circuit and tending to close the switch and another electromagnet connected across the current limiting means and tending to hold the switch open.

2. The combination of a work circuit, and means for limiting the current therein in accordance with predetermined conditions, said means having a plurality of resistance sections, a switch for each section for controlling the relation between the work circuit and corresponding resistance section, and a pair of electromagnets for each switch, one electromagnet of each pair being connected in series with the work circuit and tending to close the switch and the other electromagnet of each pair being connected in multiple with the resistance sections and tending to prevent closure of the switch.

3. A current control system having a motor armature in which the current is to be controlled, current limiting means for controlling the current therein, a switch arm cooperating with said means, and a pair of electromagnets acting on said arm, one electromagnet being adapted to be connected in series with the motor armature and tending to close the switch and the other electromagnet being adapted to be connected across the current limiting means and tending to hold the switch open.

4. In a current control system the combination of a motor armature, current limiting means therefor, a pair of electromagnets one adapted to be connected in series with the motor armature and the other adapted to be connected in shunt of said current limiting means, and a switch arm for controlling said current limiting means and acted upon by both of said electromagnets by the first to close the switch and by the second to hold the switch open.

5. A system for controlling the starting current of a motor comprising current limiting resistance for the motor, a switch for controlling said resistance, an arm effecting the open and closed conditions of said switch, a hold out coil adapted to be connected in shunt of said resistance and acting on said arm to hold the switch open, and a closing coil adapted to be connected in series with the motor armature and acting on said arm to close the switch.

6. The combination of a motor armature circuit, current limiting resistance therefor, a switch cooperating with said resistance to decrease the resistance in the armature circuit when the switch is closed, and a pair of electromagnets one connected to be affected by the current in said armature circuit for closing said switch and the other being connected to be affected by a fall of potential over said resistance and acting to hold said switch open.

7. In a motor control system a plurality of switches adapted to control current limiting means for the motor armature and having hold out coils adapted to be connected in shunt of the current limiting means and closing coils adapted to be connected in series with the motor armature and means for bringing said switches successively into action.

8. A system for controlling the amount of resistance inserted in the armature circuit of a motor comprising a plurality of resistances, and a plurality of switches having closing coils controlled by the total armature current and hold out coils and adapted to act in succession upon the occurrence of predetermined current conditions of the motor armature circuit to successively connect said resistances in parallel in the motor armature circuit to reduce the resistance thereof.

9. A system for controlling the amount of resistance inserted in a work circuit comprising a plurailty of resistances, a plurality of switches, means responsive to current in the work circuit tending to actuate each of said switches, and means responsive to variations in the drop of potential across said resistances for opposing each of said switch actuating means but permitting the actuation of said switches to successively connect said resistances in parallel in the work circuit in accordance with predetermined conditions therein.

10. In a control system having a work circuit including a current limiting means, automatic means for controlling said current limiting means, said automatic means comprising a switch including a current closing coil subject to variations of current in the current limiting means, and a potential hold out coil subject to variations of potential across the current limiting means, whereby the current limiting means is rendered ineffective under predetermined conditions.

11. In a control system having a work circuit including a plurality of resistance units adapted to be connected in shunt relation, automatic means for successively effecting such a connection, said means comprising a switch for each unit, each switch including a series closing coil, each of said coils being connected in series and subject to current variations in the work circuit, and a potential hold out coil subject to variations of potential across the current limiting means.

12. In a system for controlling the amount of resistance in a work circuit, a switch comprising a current closing coil subject to the variations of current in the work circuit and a potential hold out coil subject to variations of potential across the resistance so that under predetermined conditions the resistance will automatically be rendered ineffective by the coaction of said coils.

In witness whereof, I have hereunto subscribed my name.

CLARENCE T. EVANS.